April 16, 1935.  L. T. WATRY  1,997,880
GUIDE COUPLING
Filed March 25, 1932  3 Sheets-Sheet 2
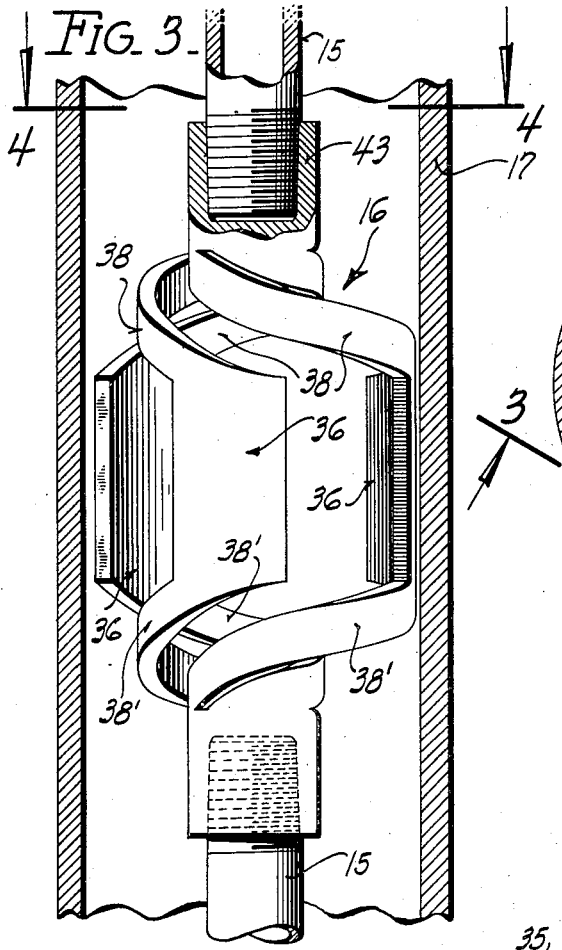
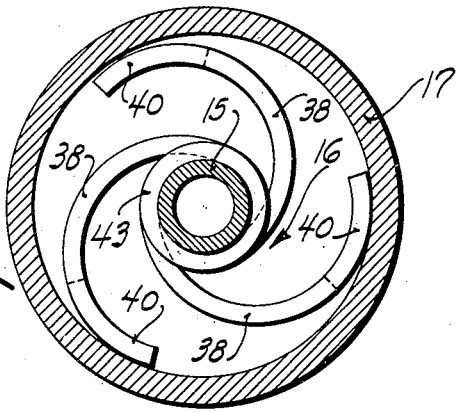
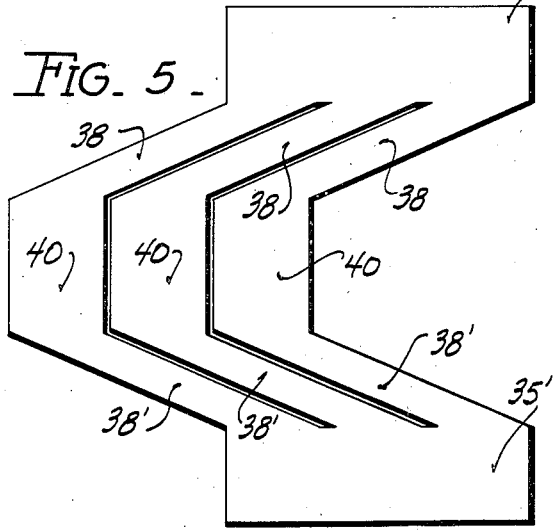
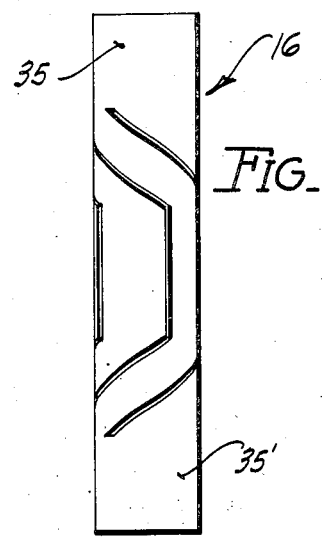
INVENTOR
*Louis T. Watry*
BY *Ira Milton Jones*
ATTORNEY

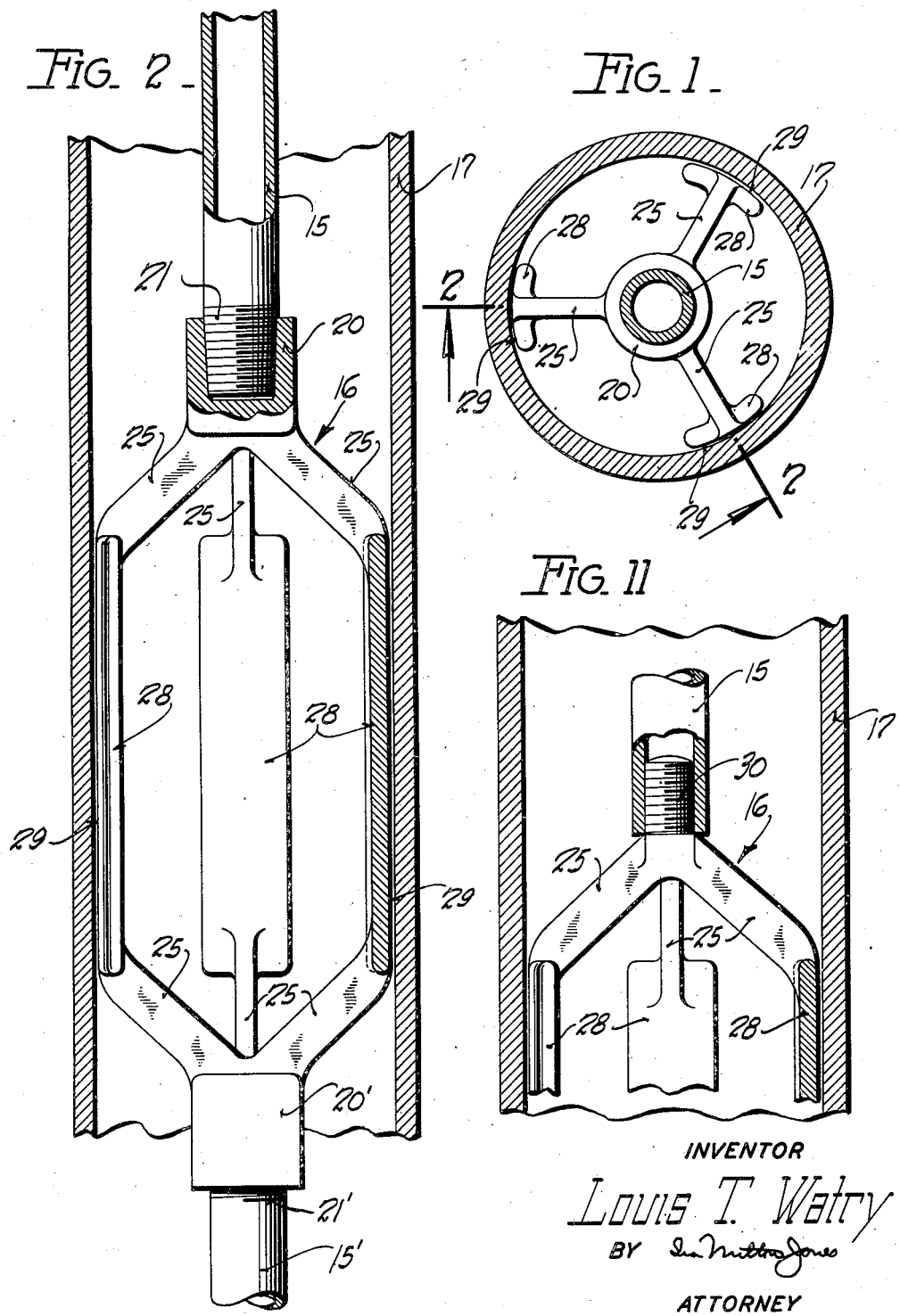

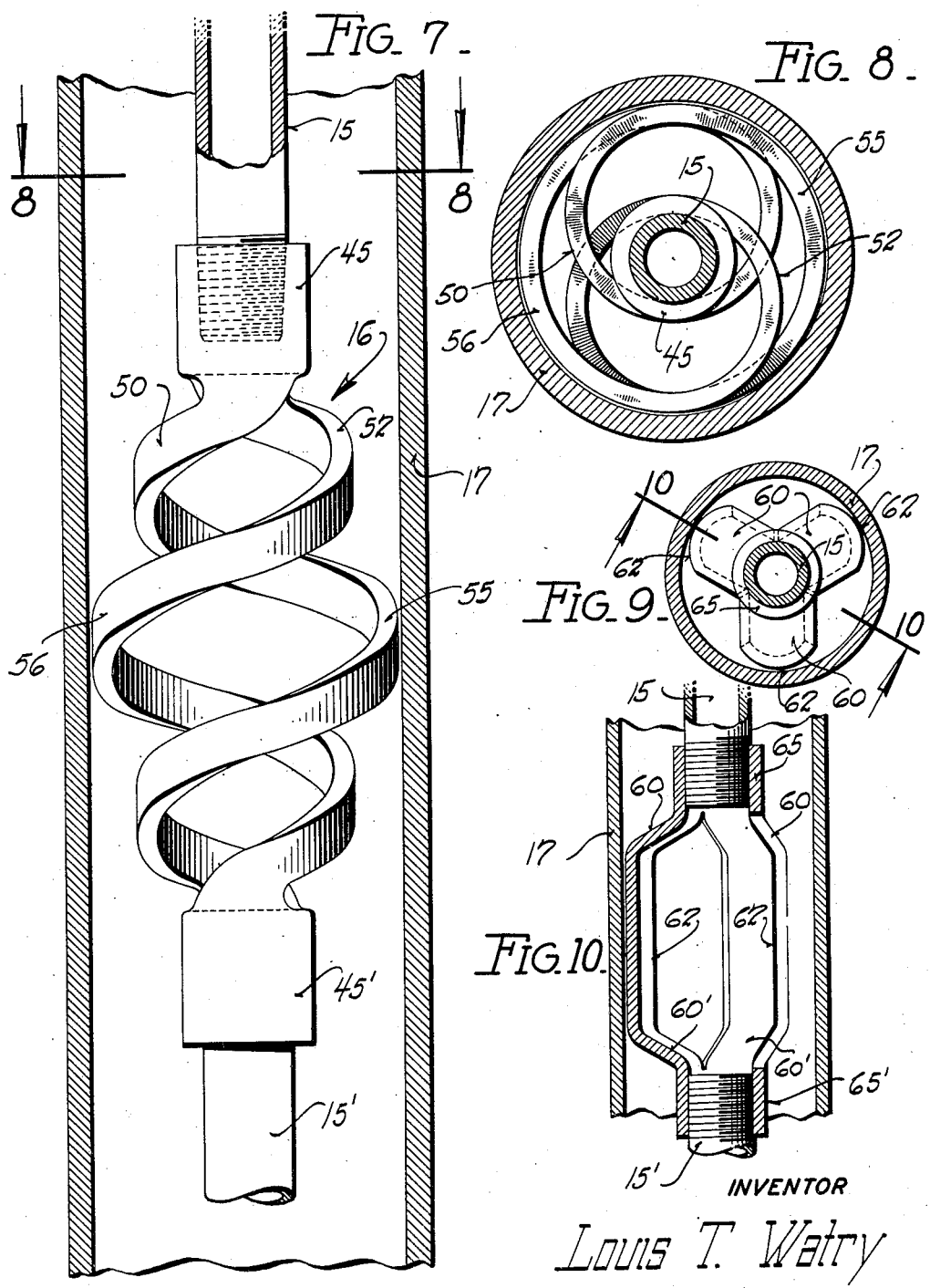

Patented Apr. 16, 1935

1,997,880

UNITED STATES PATENT OFFICE 1,997,880

GUIDE COUPLING

Louis T. Watry, West Allis, Wis.

Application March 25, 1932, Serial No. 601,116

3 Claims. (Cl. 255—28)

This invention relates to guide couplings and more particularly to a guide coupling adapted to couple together adjoining pieces of rods in a casing and hold the rods centered relative to the casing.

In all cases in which a rod is reciprocated in a surrounding casing such as in both double and single acting pumps, and in well drilling, it is essential, if the rod is to be placed under any compressive stress, that centering devices be used to support the rod against whipping or buckling within the casing.

In such centering devices or guides heretofore used, the guides have been separate and distinct members from the coupling members. This has resulted in reduced area available to the waterways, or as an alternative, has resulted in decreased strength of the guides.

It is an object of the present invention, therefore, to provide a guide for a sucker or drill rod which will combine the guiding feature with the coupling feature.

It is a further object of the present invention to provide a guide having some degree of resiliency which will take the strain from the pipe at the ends of the reciprocating stroke.

Another object of the invention is to provide a guide of maximum strength and minimum resistance to the flow of liquid.

It is another object of the invention to produce a coupling member to be used in connection with hollow sucker rods which will seal each section of the coupling rod individually; and other objects will become apparent upon consideration of the following description.

A structure embodying the invention is illustrated in the accompanying drawings and will be hereinafter fully described, the invention residing in certain novel features which will be particularly pointed out in the appended claims.

In the drawings:

Figure 1 is a cross section of a casing showing a hollow sucker rod therein with a guide coupling embodying the present invention installed thereon;

Figure 2 is a cross section on the line 2—2 of Fig. 1;

Figure 3 is a modification of the invention, being a view similar to Fig. 2;

Figure 4 is a cross section on the line 4—4 of Fig. 3;

Figure 5 is a developed view of the device shown in Fig. 3;

Figure 6 is an elevational view of the centering device shown in Fig. 3 before bending out the centering fingers;

Figure 7 is a view similar to Fig. 2 of a second modification;

Figure 8 is a cross section on the line 8—8 of Fig. 7;

Figure 9 is a third modification of a coupling bent from a single piece of connecting pipe;

Figure 10 is a cross section on the line 10—10 of Fig. 9; and

Figure 11 is a modification of the device shown in Fig. 2.

Referring to the accompanying drawings in which like numerals indicate like parts throughout the several views, a rod 15 is joined to a second rod 15' through the medium of a guide coupling, generally designated 16, which forms the subject matter of the present invention. If desired, the rods 15 may be made hollow in order to increase their rigidity and permit the use of longer rod sections for a given load. The rods 15 and 15' together with the guide coupling reciprocate in a casing 17, the guide coupling centering the rods 15 and 15' therein.

Referring to Figs. 1 and 2, the guide coupling 16 is formed of a pair of caps 20 and 20' internally threaded and adapted to receive the threaded ends 21 and 21' of the hollow rods 15 and 15' respectively.

A spider having a plurality of arms 25, composed of three or more radiating ribs, is formed integrally on each of the caps 20 and 20', the arms on each of the caps 20 and 20' extending outwardly and towards the other cap. Boots 28 having outer arcuate faces 29 connect corresponding arms 25 of the spiders to form an integral structure adapted to transmit stress between the caps 20 and 20'. The arcuate faces 29 of the boots 28 have a running fit in the casing so as to effectively center the rod 15—15' therein.

As will be seen in the drawings, the arms 25 are relatively narrow and deep, not only to lend strength to the structure, but to cut down the flow resistance through the coupling.

It will also be noted that since the rod 15—15' does not extend through that portion of the casing occupied by the boots and the arms, the only obstruction to the flow of fluid in that section are the boots 28 and the arms 25. Since the combined cross sectional area of the boots or of the arms is approximately equal to that of the hollow rod 15—15', it is evident that the resistance to flow through the guide coupling is little if any greater than that obtained between the joints.

The efficiency of the coupling may be still further increased by the structure shown in Fig. 11. In that figure, a solid plug 30 is used to replace the cap 20 in forming the connection with the sucker rod.

Both Figs. 1 and 2, and Fig. 11 provide closures for the individual hollow rods 15 so that each rod 15 acts at least partially as a float independently of the other rods and in the event of a leak forming in one of the rods 15, the remaining rods would not be affected thereby.

Figs. 3 to 6 inclusive show a modified form which may be either formed from a casting or for lighter installations, cut from a piece of sheet material and bent into form. The latter instance is illustrated in Figs. 5 and 6, in which the connection is made through sleeves 35 and 35' which are bent in a cylinder as shown in Fig. 6, welded on the mating edges and tapped on the inside to receive the corresponding ends of the rods 15 and 15'.

The connecting members are cut of trapezoidal strips, generally referred to as 36, and having inwardly directed arms 38 and 38' connected by a connecting strip or boot 40 on the narrow end of the trapezoid.

The arms 38 and 38' are bent outwardly to form helical spirals as shown in Fig. 4 with the connecting portions or boots 40 in running engagement with the casing 17. If it is preferred to make this form of a casting, the article may be cast in the form shown in Fig. 3 with a cup member such as 43 for closing the lower end of the hollow rod 15.

Figs. 7 and 8 show a further modification in which cup members 45 and 45' are connected with a pair of spirals 50 and 52, each of which are connected to the cap 45 and spiralled outwardly in a vertical helix or so called helical spiral, into contact with the casing 17 where the curve changes to a pure helix forming a boot in running engagement with the casing 17 for one-half a revolution, the lower portions of the members 50 and 52 describing a helical spiral and connecting to the second cap member 45 which is attachable to the rod 15' through cooperating screw threads.

Figures 9 and 10 show a modification of the invention which may be used where economy is essential rather than efficiency. In this form, a pipe is split vertically for a portion of the length in three of more parts, the split portion being bent outwardly as shown at 60 and 60' with a cylindrical portion 62 connecting the outer ends of the bent-out portions 60 and 60'. The ends 64 and 64' of the pipe which are left unsplit are threaded to receive the ends of the rods 15 and 15' respectively.

Each of the forms of the invention shown is composed essentially of the connecting members joined to the adjacent sections of the rod with outwardly directed web members formed on the connecting members and the boots joining corresponding web members. This construction lends resiliency to the structure through the web members in the same manner as would a spiral spring. The resiliency, while not great, is sufficient to remove a considerable amount of stress from the rod at the ends of the stroke which lessens to a marked degree failures of the pipe through fatigue.

Having thus described the invention, it is realized that it is susceptible to various changes and modifications coming well within the scope of one skilled in the art and it is not, therefore, desired to limit the invention to the precise form herein shown and described, but only by the scope of the appended claims.

What is claimed as new and desired to secure by Letters Patent is:

1. In a device of the character described, a casing, a rod in said casing composed of two sections, means to join said sections and hold said rod centered in the casing comprising, a cap member attached to one of said sections, a cap member attached to the other of said sections, radiating ribs formed on each of said cap members and terminating adjacent the inner periphery of said casing, shoes in working engagement with said casing and joining corresponding ribs to transmit stress between the cap members.

2. A device to couple the adjoining ends of two sections of sucker rod or the like and also center the same in a casing, comprising spaced heads connectable to said ends of the rod sections, and a plurality of arms, said arms extending radially from the common axis of the heads a distance sufficient to have their medial portions engageable with the inner wall of the casing and being of such shape that all portions thereof are disposed in edgewise alignment with said common axis of the heads so that liquid flowing through the casing may pass the arms smoothly and without excessive friction loss, said arms forming the sole connection between the spaced heads so that the space between the arms is entirely unobstructed and being of such cross section that the total cross sectional area of all of the arms at any transverse plane is no greater than the cross sectional area of one of the spaced heads.

3. A device to couple the adjoining ends of two sections of sucker rod or the like and also center the same in a casing comprising, spaced heads connectable to said ends of the rod sections, and means to connect said spaced heads comprising spaced members formed integrally with said heads and extending substantially radially from the common axis of said heads to have their medial portions engageable with the inner wall of the casing, said members being so shaped that their medial portions have substantially a surface to surface contact with the inner walls of the casing, and that all portions thereof are disposed edgewise to the flow of liquid through the casing to enable such liquid to pass said members smoothly and without excessive friction loss and said members forming the sole connection between the spaced heads so that the space between the members is entirely unobstructed.

LOUIS T. WATRY.